(12) United States Patent
Onopa et al.

(10) Patent No.: US 7,588,357 B2
(45) Date of Patent: Sep. 15, 2009

(54) MULTI-FUNCTION LAMP FOR A MOTOR VEHICLE

(75) Inventors: David P Onopa, Allentown, PA (US); Jeffrey Robert Cotner, Macungie, PA (US); Charles J Groeller, Orefield, PA (US)

(73) Assignee: Mack Trucks, Inc., Allentown, PA (US)

( * ) Notice: Subject to any disclaimer, the term of this patent is extended or adjusted under 35 U.S.C. 154(b) by 98 days.

(21) Appl. No.: 11/792,556

(22) PCT Filed: Dec. 8, 2004

(86) PCT No.: PCT/US2004/041014

§ 371 (c)(1),
(2), (4) Date: Jun. 7, 2007

(87) PCT Pub. No.: WO2006/062514

PCT Pub. Date: Jun. 15, 2006

(65) Prior Publication Data

US 2008/0232123 A1 Sep. 25, 2008

(51) Int. Cl.
*B60Q 1/32* (2006.01)
(52) U.S. Cl. .................... 362/485; 40/556; 362/498
(58) Field of Classification Search .............. 362/485, 362/495, 496, 498–501; 40/556
See application file for complete search history.

(56) References Cited

U.S. PATENT DOCUMENTS

| | | | | |
|---|---|---|---|---|
| 3,902,159 | A | * | 8/1975 | Parolin ................... 340/433 |
| 5,604,480 | A | * | 2/1997 | Lamparter ............... 362/478 |
| 6,419,306 | B2 | * | 7/2002 | Sano et al. .............. 296/209 |
| 6,604,834 | B2 | * | 8/2003 | Kalana ...................... 362/84 |

* cited by examiner

*Primary Examiner*—John A Ward
(74) *Attorney, Agent, or Firm*—Volvo Technology of America, Corporate Patents; Martin Farrell; Michael B. Pruden

(57) ABSTRACT

A multi-function lamp system includes a lamp, which may include illuminable text, position beneath the door of a vehicle. The lamp may be illuminated to perform at least the following functions: side blinker and running board illumination.

22 Claims, 5 Drawing Sheets

MULTI-FUNCTION LAMP FOR A MOTOR VEHICLE

BACKGROUND OF THE INVENTION

1. Field of the Invention

The present invention relates to a lamp for a motor vehicle, and more particularly, to a multi-function illuminated display device for a motor vehicle.

2. Description of the Related Art

Motor vehicles are outfitted with a number of different lights and lamps for performing many different functions. For example, motor vehicles will include head lamps, blinkers, brake lights, and cabin lights. Vehicles may be modified with "aftermarket" illumination devices that provide decorative or useful embellishments in the form of letters, logos or designs. Some examples of prior devices are described below.

U.S. Pat. No. 1,428,066 is directed to an automobile step for motorcycles or cars. The step includes a sign for identifying the vehicle that may include letters or other symbols and which can be fitted with back lenses and lit with a lamp.

U.S. Pat. No. 1,691,684 is directed to a safety lighting device for automobiles. The lighting device is mounted on a vehicle such that the device can be pivoted into different positions for warning and safety purposes. For example, the device can be rotated outward so that oncoming traffic can see it. The device may be mounted on the vehicle such as by clamp or bracket.

U.S. Pat. No. 6,597,330 is directed to a lighted bumper. The bumper includes windows or lenses through the bumper which can be illuminated with lamps. The windows or lenses can be in the shape of letters and can be used to spell out words. The lighted bumper can be connected with the brake lights so that the sign is illuminated during braking.

U.S. Pat. No. 5,641,211 is directed to a lighted door entrance strip for a vehicle. The entrance strip may include symbols to form words and is connected to the existing door switch so that it turns on and off when the doors open and close. The sign is positioned on the door scuff plate and is not visible from outside the vehicle.

U.S. Design Pat. No. D410,612 is directed to a boat trailer having a back lighted trailer step. The sign is ornamental in nature and is built into the step.

U.S. Pat. No. 6,419,306 is directed to an illuminating plate for a car, which is positioned as a scuff plate in the car door entrance. The illuminated device illuminates when the door is open and is not visible unless the door is open.

U.S. Pat. No. 6,604,834 is directed to a flat electroluminescent surface lighting device. The electroluminescent panel can display words such as an advertisement, and can be positioned on running boards, nerf bars, steps or stepsides.

U.S. Pat. No. 6,735,893 is directed to a three dimensional sign that is attached to a vehicle. The sign is equipped with indirect lighting so as to allow recognition of the sign at dawn, dusk, or in the dark. Generally, the sign is for aesthetic purposes and is typically positioned on a rear portion of a sports car.

The prior art includes a number of different illumination devices for use with motor vehicles. A number of illumination devices exist which may display words, logos or designs. However, these devices are typically aesthetic or decorative, or may perform one additional function. There exists a need, however, for new and improved illumination devices that perform multiple functions in addition to aesthetics or decorations.

SUMMARY OF THE INVENTION

This invention includes a multi-function lamp for a motor vehicle. The lamp may include illuminable letters, a design or symbols, which could form words, a logo or a sign. The lamp is configured to perform a plurality of functions which could include, but not limited to, side blinker function, step illumination, entry step illumination, running light function and hazard light function.

According to an embodiment of the present invention, a multi-function lamp is provided for a motor vehicle having side steps. A lamp is positioned under a door of the motor vehicle. The lamp includes a plurality of illuminable letters and is configured to illuminate the letters simultaneously with at least one illumination system of the motor vehicle and illuminates the side steps of the vehicle.

According to another embodiment of the present invention, a multi-function lamp is provided for a motor vehicle having side steps. The lamp includes illumination means for illuminating simultaneously with at least one illumination system of the motor vehicle and for illuminating the side steps of the motor vehicle.

Further applications and advantages of various embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

According to an embodiment of the present invention, a multi-function illumination device (lamp) which may be positioned on a vehicle (e.g., a truck) below the door in a recessed area of the sill, above the side-steps of the vehicle. The lamp can display words such as a logo, e.g., "MACK®," and can be powered by the vehicle's electric wiring system. A lamp may be placed on both sides of the vehicle. The, lamp can be illuminated to provide a number of different functions such as: side-step lighting, turn signaling, side marker function, logo illumination and entry step illumination. Accordingly, the lamp may be illuminated in response to different events in order to provide motor vehicle functions in addition to the functions of a sign.

Figure 1:
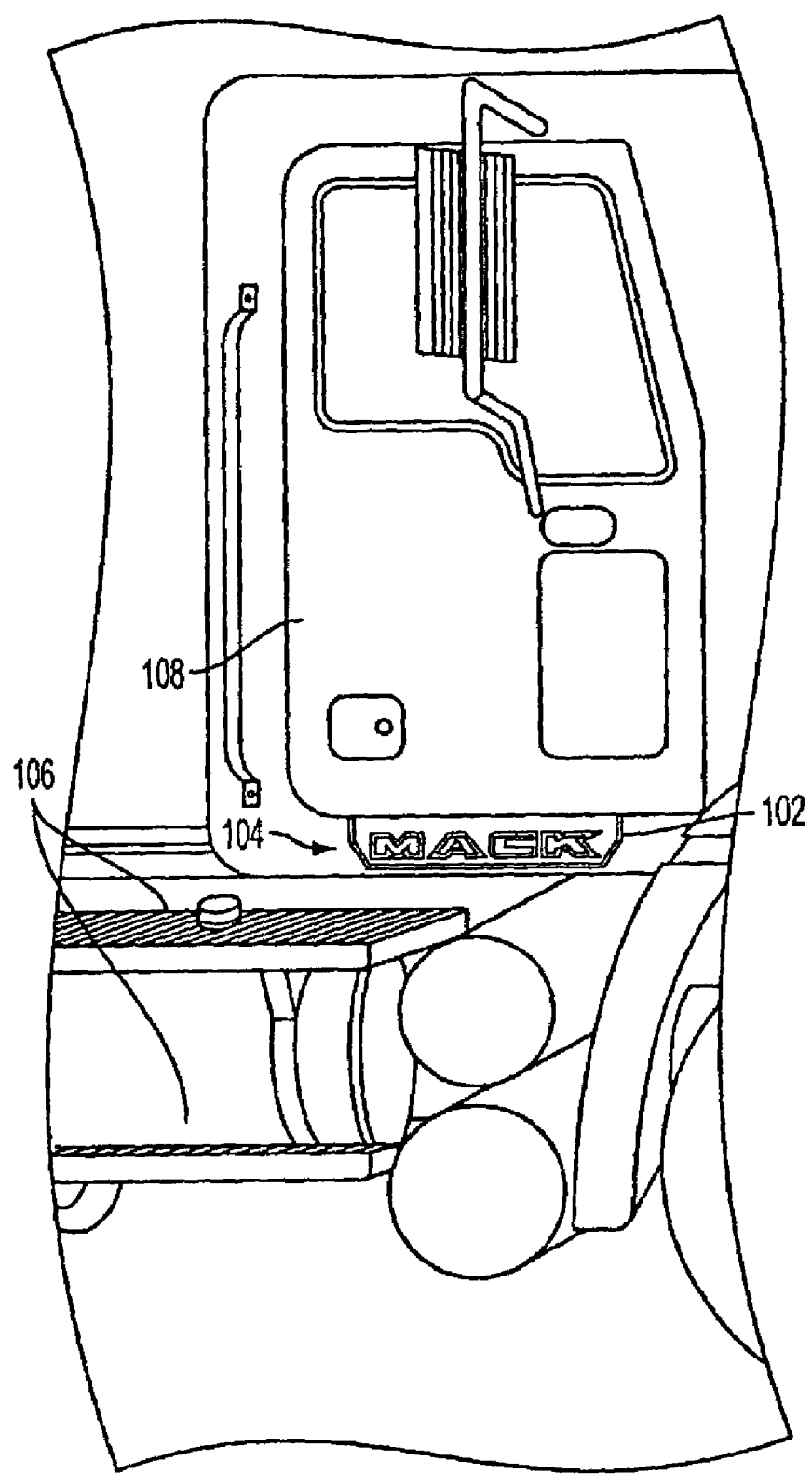
FIG. 1 is a side view of a truck including a multi-function illumination device according to an embodiment of the present invention.

FIG. 1 shows a side view of a truck outfitted with a multi-function lamp of the present invention. As shown, a lamp (102) is positioned in a recess in a sill (104) disposed above the side steps (106) and below the vehicle door (108). Accordingly, the novel placement of lamp (102) allows it to illuminate the side steps (106), provide side mid-turn directional function, provide a side marker function, and provide entry step illumination.

Lamp (102) may be a flat panel device with a portion of the panel illuminated with a script, such as a logo, e.g., "MACK®." The lamp may be connected with the vehicle's electrical system such that it may be illuminated synchronously with other vehicle systems to perform the multiple functions. For example, the lamp (102) may be illuminated when the doors open, when the head lamps, parking lights, marker, clearance or tail lamps are illuminated, when the parking brake is initiated, when the brakes are initiated, when the corresponding directional lamp (blinker) is initiated (i.e., only the side of the direction lamp being illuminated will flash), when the cabin lights are illuminated, when the hazard lights are initiated, and/or when the running lights are initiated. Lamp (102) may be configured to be illuminated by different light intensities, for example, a high and low intensity. By allowing a lamp to be illuminated with different light intensities, the lamp can remain illuminated during such functions as blinker, braking or hazard functions. For example, when the headlights are illuminated, lamp (102) may be illuminated at a low intensity. When the corresponding blinker is activated, lamp (102) could be caused to alternate between on and off or between a high and low intensity synchronous with the vehicle blinkers. Lamp (102) could simply be turned on and off to perform the various functions.

Figure 2:
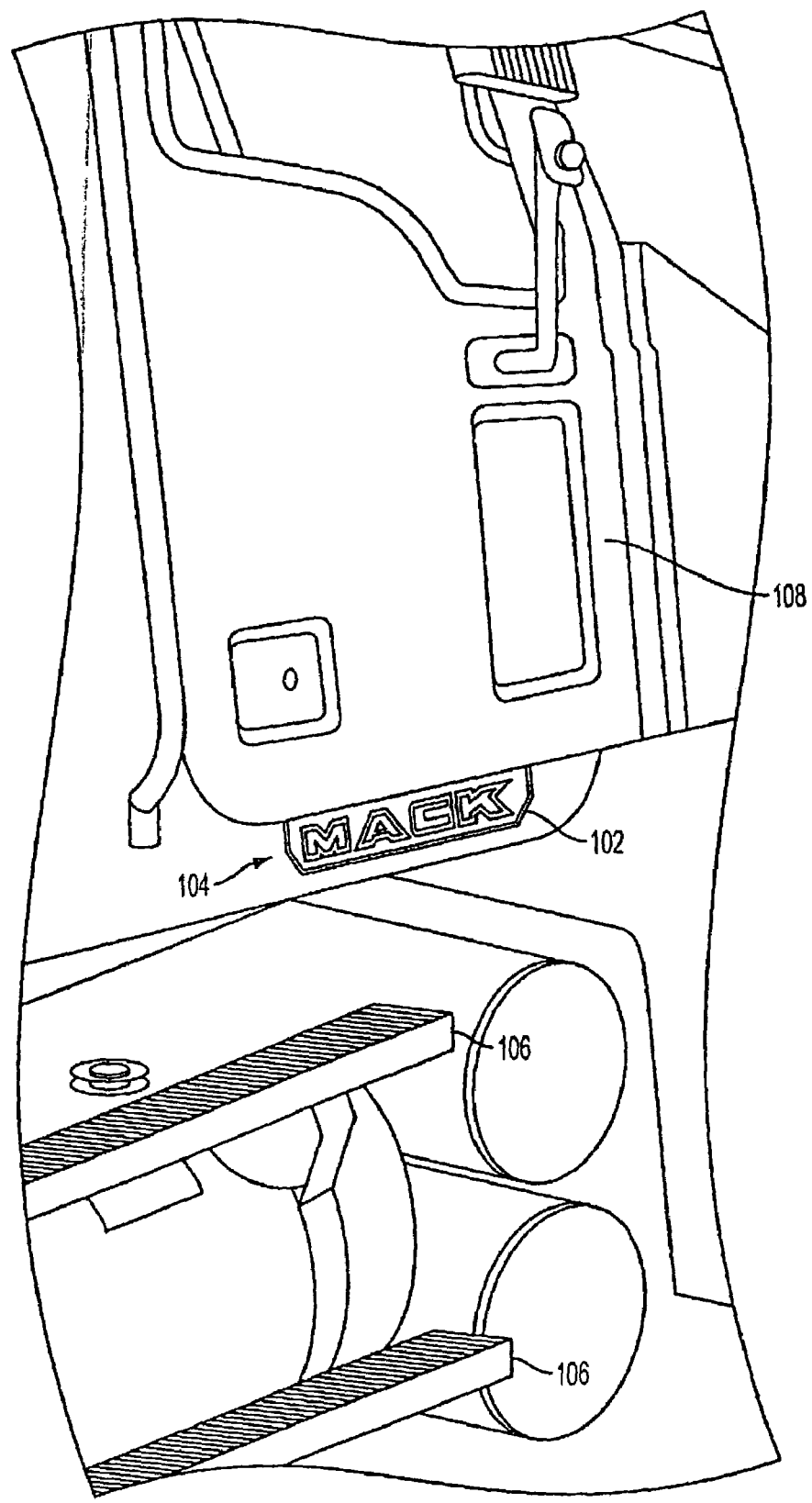
FIG. 2 is a second view of the multi-function illumination device of the present invention.

FIG. 2 shows a second view of the lamp (102). At this angle, one can see the proximity of lamp (102) to the side steps (106) is convenient for illumination of the side steps (106).

Figure 3:
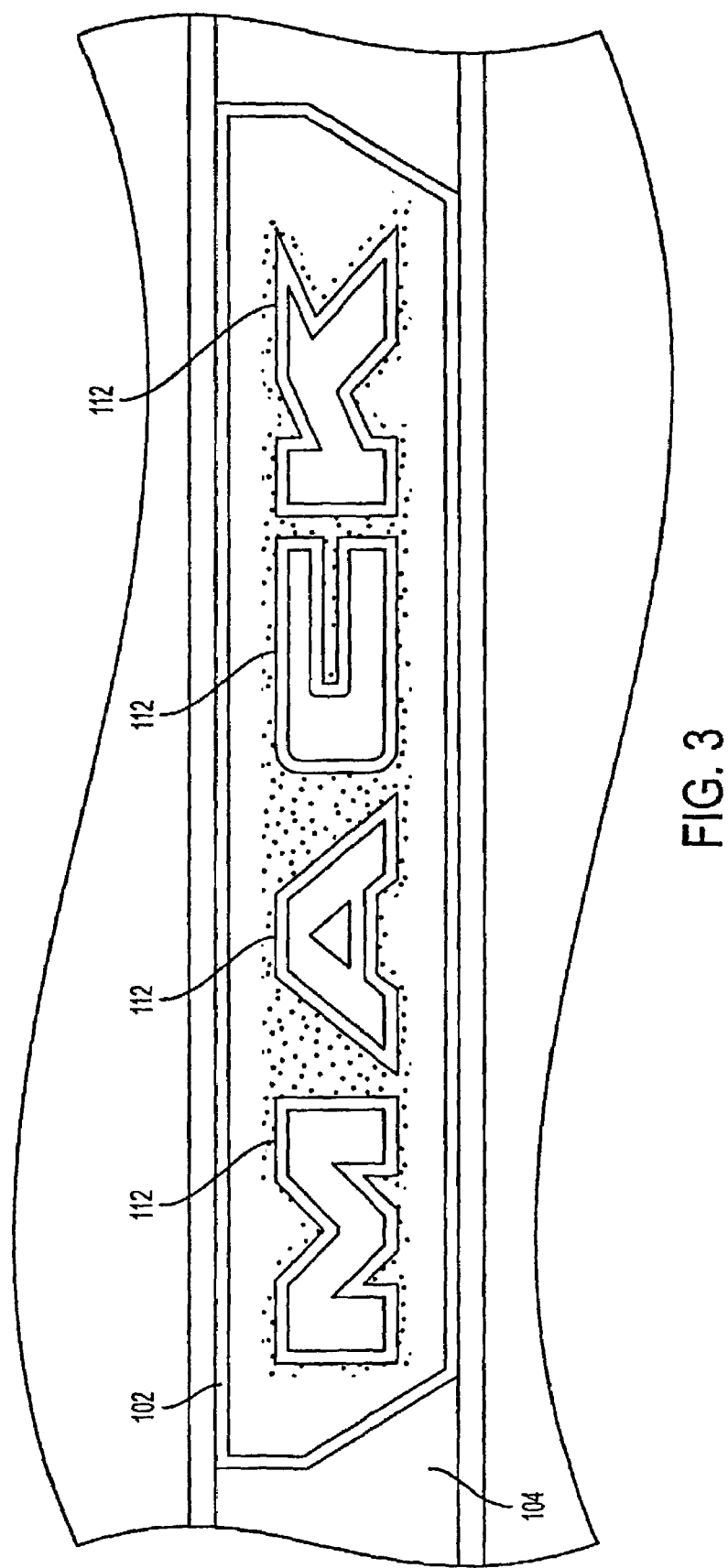
FIG. 3 is an image of the multi-function illumination device of the present invention in a partially illuminated mode.
Figure 4:
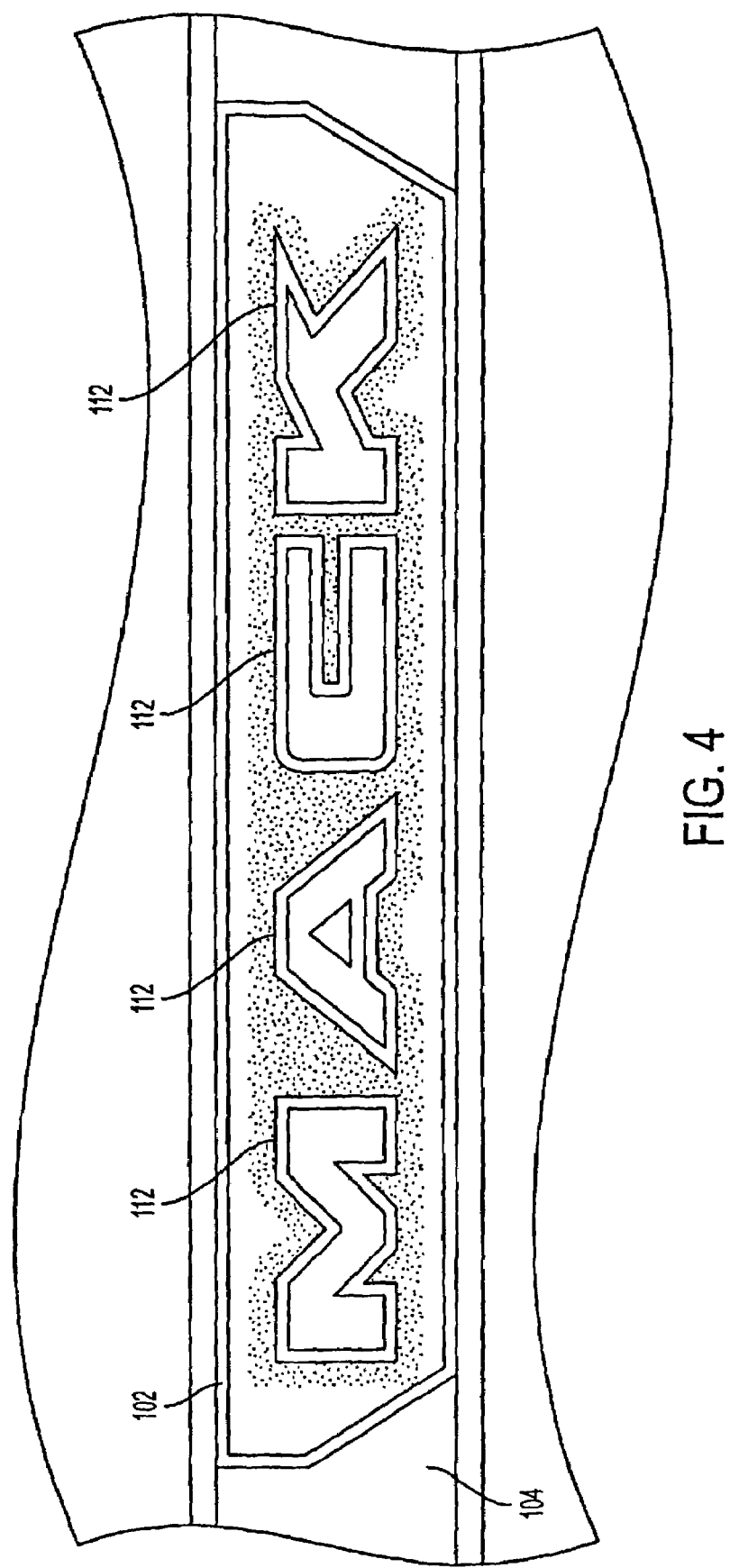
FIG. 4 is an image of the multi-function illumination device of the present invention in a full illuminated mode.

FIGS. 3 and 4 are close-ups of lamp (102) recessed in sill (104). In FIG. 3, the lamp (102) is shown as partially illuminated. In FIG. 4, the lamp (102) is fully illuminated. As shown in FIGS. 3 and 4, the lamp may include letters to form a logo. It is preferable that the lamp is easily recognizable and legible at all times by onlookers, such as those in passing vehicles or pedestrians. Therefore, the letters (112) of the lamp (102) could be constructed of a material that is both illuminable and easily seen during daylight. Of course, symbols or other images could be illuminated as well.

Figure 5:
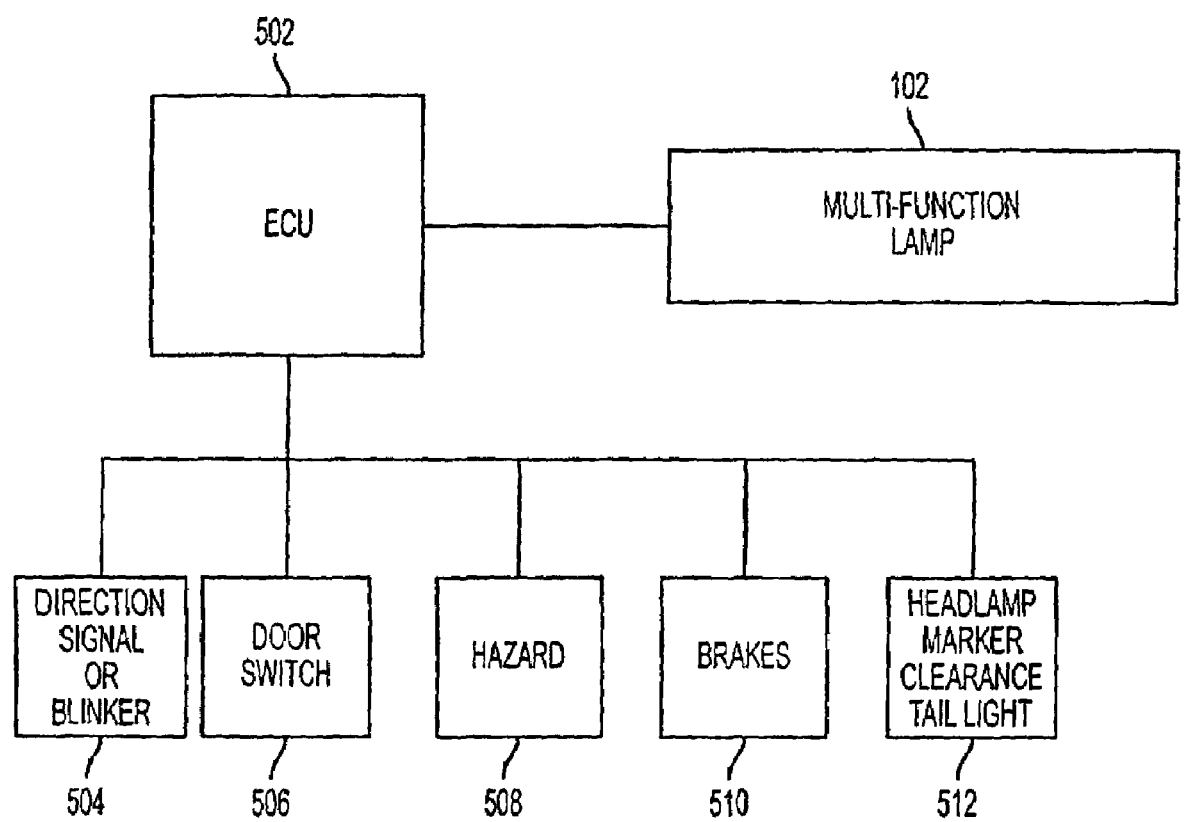
FIG. 5 is a block diagram of a multi-function illumination device of the present invention coupled with the electronic system of a motor vehicle.

FIG. 5 is a block diagram showing the multi-function lamp coupled with the vehicle's electrical and control systems. Lamp (102) could be coupled with the vehicle's ECU (502), which in turn may be configured to control various vehicle functions. Accordingly, ECU (502) may be coupled with the vehicle blinker (504), door switches (506), hazard system (508), brakes (including parking brake) (510), and head lamp system (512), which may include marker, clearance and tail light functions.

One having ordinary skill in the art will recognize that many such vehicle systems are not necessarily coupled with or controlled by a vehicle's ECU (502). Therefore, multi-function lamp (102) could be connected directly with a vehicle's electrical system such that the lamp (102) is illuminated to perform functions as described above. For example, the lamp (102) could be connected directly with the blinker control circuit (not shown) so that the lamp (102) is powered corresponding to blinker operation—i.e., when a left blinker is activated, the lamp (102) under the driver-side door is flashes, and when the right blinker is activated, the lamp (102) on the passenger-side flashes. Lamp (102) could similarly be connected with circuits for door switch(es), hazard controls, brake lighting system, and/or head lamp lighting system.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:

1. A multi-function lamp for a motor vehicle having side steps, comprising:
a lamp positioned under a door and above the side steps of said motor vehicle, said lamp having a plurality of vertically disposed, illuminable letters configured to illuminate said letters simultaneously with at least one illumination system of said motor vehicle and to provide light onto the side steps.

2. The lamp as recited in claim 1, wherein said at least one illumination system includes a directional signal lamp system of said motor vehicle.

3. The lamp as recited in claim 1, wherein said at least one illumination system includes headlight functions.

4. The lamp as recited in claim 1, wherein said at least one illumination system includes marker functions.

5. The lamp as recited in claim 1, wherein said at least one illumination system includes clearance light functions.

6. The lamp as recited in claim 1, wherein said at least one illumination system includes tail light functions.

7. The lamp as recited in claim 1, wherein said at least one illumination system includes a hazard light system.

8. The lamp as recited in claim 1, wherein said at least one illumination system includes a door lighting system.

9. The lamp as recited in claim 8, wherein said lamp is further electrically connected with a door switch of the door said lamp is positioned below, such that said lamp further performs entry step illumination when said door is open.

10. The lamp as recited in claim 1, wherein said lamp is recessed in a sill below said door of said motor vehicle.

11. The lamp as recited in claim 1, wherein said lamp is electrically connected with a headlight system of said vehicle and with a blinker system of said vehicle such that said lamp further performs side directional signal functions and running light functions.

12. The lamp as recited in claim 1, wherein said illuminable letters are visible when said lamp is not lighted.

13. The lamp as recited in claim 1, wherein the lamp is a flat panel device positioned on a sill below the door.

14. A multi-function lamp for a motor vehicle having side steps, comprising:
a lamp recessed in a sill below a door and above the side steps of said motor vehicle, said lamp including letters which are illuminated when said lamp is illuminated; and,
means for illuminating said lamp simultaneously with at least one illumination system of said motor vehicle and wherein said lamp is positioned for illuminating the side steps of said motor vehicle.

15. The lamp as recited in claim 14, wherein said at least one illumination system includes a directional signal lamp system of said motor vehicle.

16. The lamp as recited in claim 14, wherein said at least one illumination system includes a head light system.

17. The lamp as recited in claim 14, wherein said at least one illumination system includes a hazard light system.

18. The lamp as recited in claim 14, wherein said at least one illumination system includes a door lighting system.

19. The lamp as recited in claim 14, wherein said at least one lamp is electrically connected with a headlight system of said vehicle and with a directional signal system of said vehicle such that said lamp performs side direction signal functions and running light functions.

20. The lamp as recited in claim 19, wherein said at least one lamp is further electrically connected with a door switch of the door said lamp is positioned below, such that said lamp further performs entry step illumination when said door is open.

21. The lamp as recited in claim 14, wherein said illumination means includes illuminable letters that are visible when said lamp is lighted or not lighted.

22. The lamp as recited in claim 14, wherein said letters are positioned on a vertical surface of the sill.

* * * * *